United States Patent

Meyer

Patent Number: 5,497,233
Date of Patent: Mar. 5, 1996

[54] OPTICAL WAVEGUIDE VIBRATION SENSOR AND METHOD

[75] Inventor: A. Douglas Meyer, West Hills, Calif.

[73] Assignee: Litton Systems, Inc., Woodland Hills, Calif.

[21] Appl. No.: 281,338

[22] Filed: Jul. 27, 1994

[51] Int. Cl.$^6$ .................................................. G01B 9/02
[52] U.S. Cl. ......................................... 356/345; 73/657
[58] Field of Search .......................... 356/345; 73/657; 205/227.19, 227.27; 385/12, 14

[56] References Cited

U.S. PATENT DOCUMENTS

| | | | |
|---|---|---|---|
| 4,632,551 | 12/1986 | Pavlath | 356/345 |
| 4,899,042 | 2/1990 | Falk et al. | 250/227.19 |
| 5,267,336 | 11/1993 | Sriram et al. | 356/345 |

OTHER PUBLICATIONS

Nelson et al., "Passive Multiplexing System for Fiber-Optic Sensors", Sep. 1, 1980, Applied Optics, pp. 2917–2920.

Primary Examiner—Samuel A. Turner
Assistant Examiner—Amanda Merlino

[57] ABSTRACT

An optical sensor that is particularly useful for measuring ground borne vibrations employs a planar optical waveguide structure to form a sensor for detecting ground born velocities and accelerations. An optical interferometer is used to detect phase shifts in optical signals guided by the waveguide caused by external vibrations. A pair of phase modulator electrodes is placed adjacent one of the legs of the interferometer and a coil of wire is connected between the pair of electrodes. A sensing element that produces a voltage in response to vibrations is connected across the electrodes. The voltage produced by the sensing element is applied to the pair of electrodes to cause phase modulation of optical signals guided by the leg of the interferometer adjacent the electrodes. The optical signals output from the interferometer are then processed to determine the velocity and acceleration associated with the vibration.

12 Claims, 4 Drawing Sheets

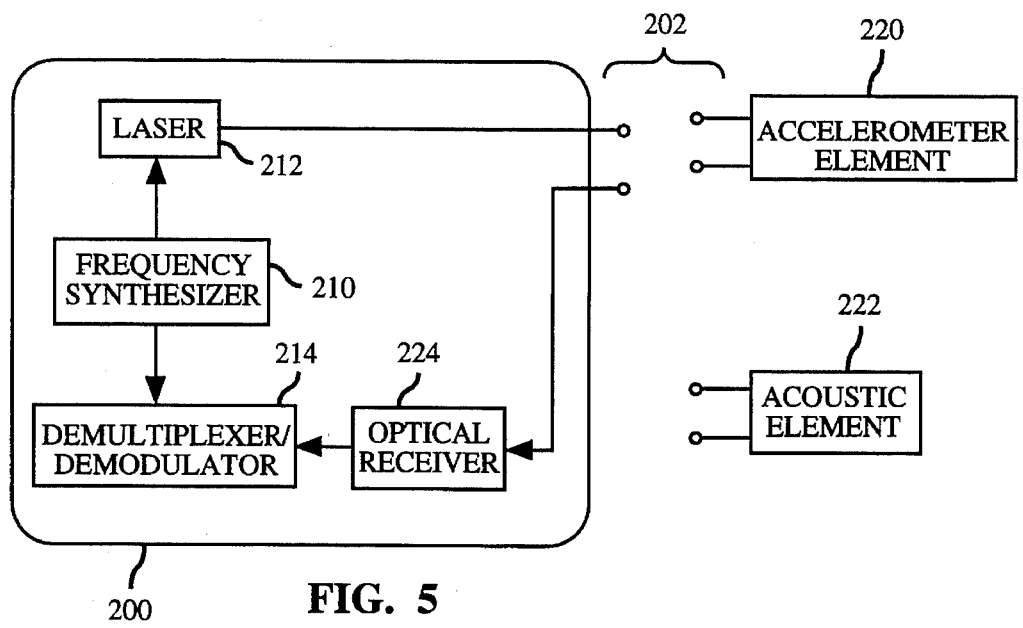
FIG. 5
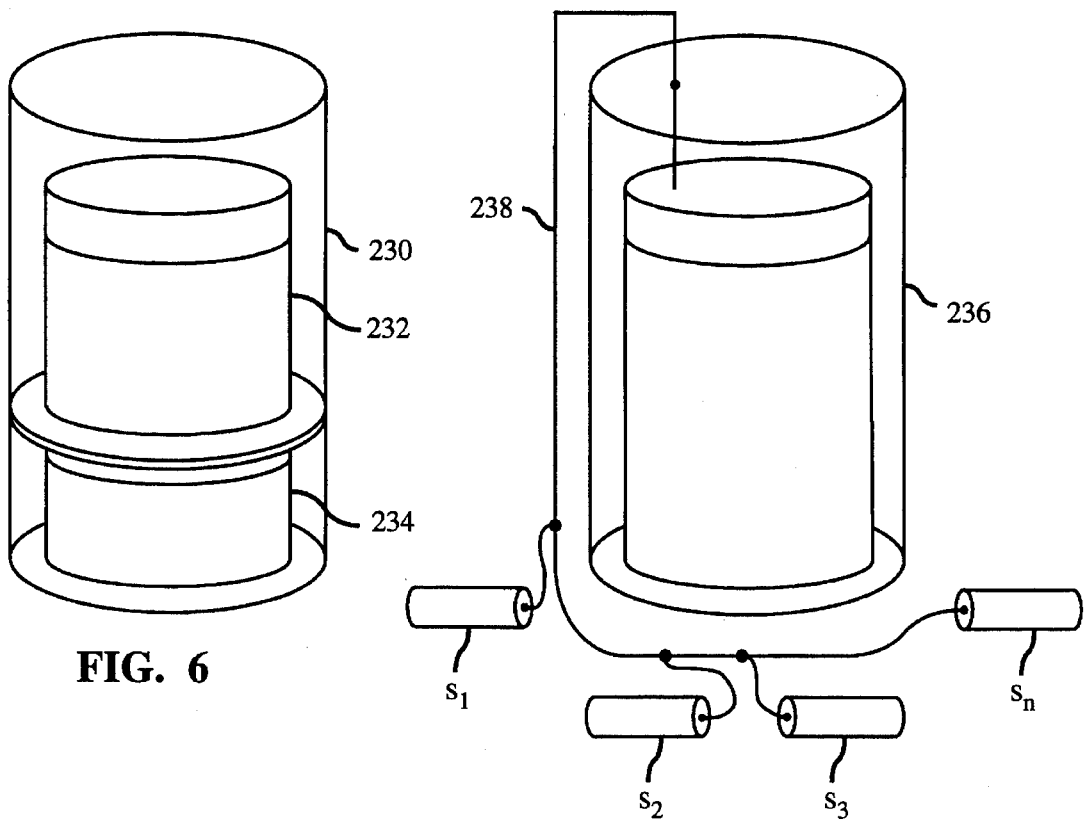
FIG. 6
FIG. 7

5,497,233

OPTICAL WAVEGUIDE VIBRATION SENSOR AND METHOD

BACKGROUND OF THE INVENTION

This invention relates generally to sensors for detecting mechanical vibrations such as sonic waves that propagate through the earth or through structures formed of solid materials. In particular, this invention relates to sensors that include interferometers to detect mechanical vibrations.

There are numerous applications of mechanical vibration sensors. One application of interest is the geophone, which may be used to detect vibrations resulting from vehicles traveling across the ground or on a highway. It is possible to determine the types of vehicle and the number of each type of vehicle in a convoy or the like by using a geophone to detect vibrations that propagate through the earth and then analyzing the resulting electrical signals.

Commercial applications of geophones include exploration for oil and minerals and testing rotating machinery for wear. In exploring for oil, for example, a plurality of geophones are placed in an array at various locations on the surface of the earth and in bores drilled into the earth. An explosive charge is used to create a shock wave, which is detected by the geophones. Analysis of the data from the geophone array then is used to determine the structure of the earth in the vicinity of the explosion and the geophones.

Mechanical vibrations in rotating machinery such as water or gas driven turbines used in electric power generation may be used to measure the amount of wear in bearings, gears and the like.

Prior art sensors for these applications typically use either piezoelectric ceramics or other mechanical means to sense the applied field. Prior art devices are electrically active in that electric power must be applied to produce an output signal. This electrical downlink can prove to be undesirable to due electromagnetic interference and undesired detection. In addition, the data that is collected and sent back to the remote location is also subject to the bandwidth limitations of twisted pair or coaxial cables. The output from these devices is electrical. Therefore, to transmit the sensed information via an optical telemetry system, a converter must be used to change the information from electrical to an optical signal, which adds expense and extra components.

SUMMARY OF THE INVENTION

The present invention is directed to a unique optical sensor that is particularly useful for measuring ground borne vibrations. The present invention employs a planar optical waveguide structure (typically lithium niobate) to form a sensor for detecting ground born velocities and accelerations. The sensor uses an optical interferometer to causing an optical phase shift to occur in optical signals guided by the waveguide in response to external vibrations. The sensor element as described herein yields the magnitude and frequency content of the disturbance and its direction. The optical sensing approaches of the present invention offers many cost and technical advantages to conventional detection and sensing applications.

The sensor as described is electrically passive in that it does not require a power source downlink. Therefore, there is a high immunity to EMI. The sensed information is converted to an optical phase shift; and therefore, no signal conversion is required and optical transmission (telemetry) can be directly used, which allows for higher transmission bandwidths which translates to more sensors per return line. An added advantage is that crosstalk between sensors is minimized or eliminated.

A sensor according to the present invention for measuring parameters of ground-borne vibrations comprises an interferometer including a first leg having a first optical path length and a second leg having a second optical path length formed so that the first optical path length is longer than the second optical path length. An optical signal generator is connected to the interferometer to apply a frequency modulated optical signal input thereto. A pair of electrodes is placed adjacent one of the legs of the interferometer and a coil of wire is connected between the pair of electrodes. A magnet is arranged to have freedom of motion longitudinally inside the coil in response to ground motion, thereby inducing a voltage in the coil, the voltage being applied to the pair of electrodes, which causes phase modulation of optical signals guided by the leg of the interferometer adjacent the electrodes. The optical signals output from the interferometer are then processed to determine the velocity and acceleration associated with the ground motion.

The interferometer may be configured as either a Mach-Zehnder or Michelson interferometer. A piezoelectric crystal may be used instead of the coil and magnet combination to detect the vibrations.

Apparatus for sensing parameters of vibrations according to the present invention may also be formed to comprise an accelerometer sensor, an acoustic sensor; and an optical signal source arranged to provide input optical signals to the accelerometer sensor and the acoustic sensor. Telemetry apparatus connected to the accelerometer sensor and the acoustic sensor produces and transmits optical signals indicative of acceleration and acoustic pressure produced by the accelerometer sensor and the acoustic sensor. An optical receiver is arranged to receive optical signal produced by the telemetry apparatus. A frequency synthesizer is connected to the optical signal source to modulate the optical signals provided to the accelerometer sensor and the acoustic sensor; and a demultiplexer/demodulator connected between the optical receiver and the frequency synthesizer to demultiplex and demodulate the signals received from the optical receiver.

An appreciation of the objectives of the present invention and a complete understanding of its structure and method of operation may be had by studying the following description of the preferred embodiment and by referring to the accompanying drawings.

BRIEF DESCRIPTION OF THE DRAWINGS

FIG. 5 schematically illustrates a modular system according to the present invention for sensing vibrations;

FIG. 6 schematically illustrates a deployable transmit/ receive electronic sensing element;

FIG. 7 schematically illustrates a deployable unit with transmit/receive electronics and sensing array;

DESCRIPTION OF THE PREFERRED EMBODIMENT

Mach-Zehnder Interferometer and Moving Magnet

Figure 1:
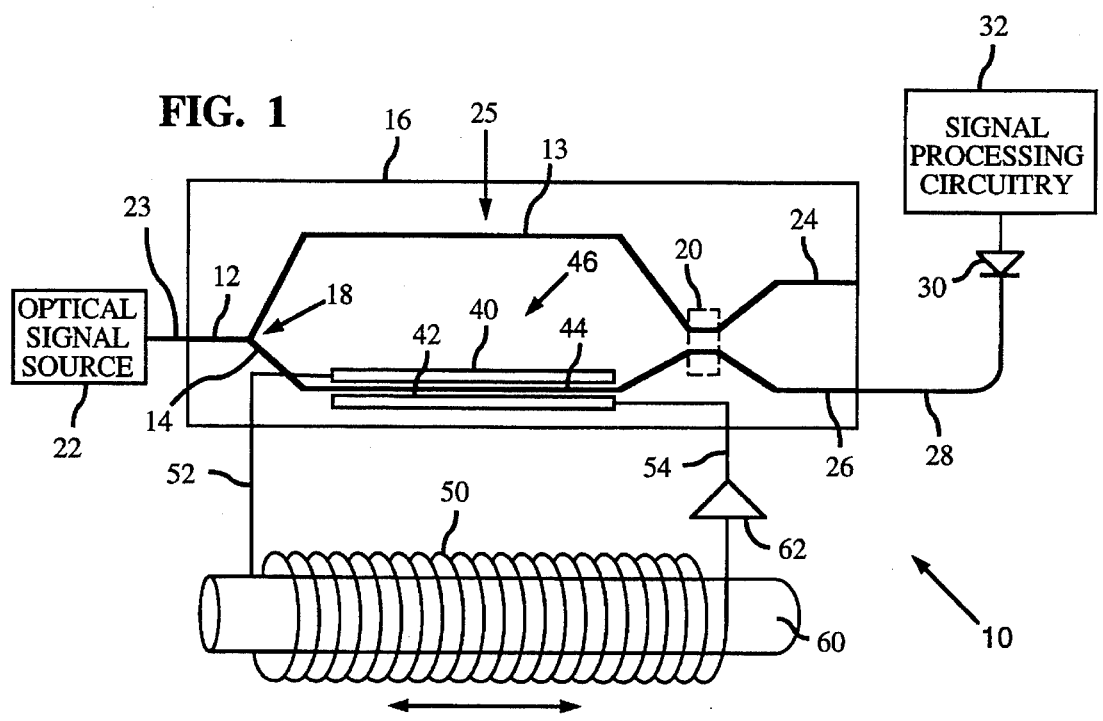
FIG. 1 schematically illustrates a first embodiment of a velocity sensor according to the present invention that includes a Mach-Zehnder interferometer formed using optical waveguides and a phase modulator.

Referring to FIG. 1, an optical velocity sensor 10 that is particularly suitable for measuring ground motion includes a plurality of waveguides 12–14 formed on an integrated optics substrate 16. The substrate 16 may be formed to comprise lithium niobate, Which is an electrooptically active material. The optical waveguides 12–14 intersect to form a Y-coupler 18. An evanescent field coupler 20 is formed between the optical waveguides 13 and 14 at a location on the substrate 16 at a location spaced apart from the Y-coupler 18. The optical waveguides 13 and 14 have different optical path lengths between the Y-coupler 18 and the evanescent field coupler 20.

An optical signal source 22, such as a laser diode, provides an optical signal to an optical fiber 23. The optical fiber 23 guides the optical signal to an end of the optical waveguide 12 at an edge of the substrate 16. The optical waveguide 12 then receives the input optical signal and guides it to the Y-coupler 18. The optical signal divides at the Y-coupler 18 between the optical waveguide 13 and the optical waveguide 14, which then guide their respective signals to the evanescent field coupler 20.

The evanescent field coupler 20 combines the waves from the optical waveguides 13 and 14 such that the waves interfere and produce an optical signal that is indicative of the phase difference of the waves that have propagated through the two mismatched optical paths between the Y-coupler 18 and the evanescent field coupler 20. The combination of the two optical waveguides 13 and 14, the Y-coupler 18 and the evanescent field coupler 20 forms a Mach-Zehnder interferometer 25. The Mach-Zehnder interferometer 25 produces an interference pattern due to interference between the waves that follow the two different optical paths. The interference pattern is output from both the waveguide sections 24 and 26.

The interference pattern between the waves appears in the portions 24 and 26 of the optical waveguides 13 and 14 that are to the right of the evanescent field coupler 20 as shown in FIG. 1. The output of the Mach-Zehnder interferometer 25 may be taken at either the waveguide 24 or the waveguide 26. FIG. 1 shows the output being taken at the end of the waveguide 26. An optical fiber 28 may be butt-coupled to the portion 26 of the optical waveguide 14. The optical fiber 28 guides the optical output of the Mach-Zehnder interferometer to a photodetector 30, which produces an electrical signal indicative of the interference pattern between the optical signals guided by the two optical waveguides 13 and 14. Signal processing circuitry 32 analyzes the electrical signal output by the photodetector 30 to look for phase changes between the interfering waves. Suitable signal processing circuitry is well-known in the art of processing signals output from optical interferometers.

A pair of electrodes 40 and 42 are formed on the substrate 16. The electrodes 40 and 42 are parallel to a portion 44 of the optical waveguide 14 and on opposite sides thereof so that a voltage applied to the electrodes 40 and 42 produces an electric field that crosses through the portion 44 of the optical waveguide 14. The electrodes 40 and 42 form a phase modulator that modulates the phase of optical signals propagating through the optical waveguide 14 through the well-known electrooptic effect.

A coil 50 of wire is formed so that a pair of electrical leads 52 and 54 extend from the ends of the coil 50 and the pair of electrodes 40 and 42, respectively. A magnet 60 is allowed to move freely along the central axis of the coil 50 due to vibrations from a source such as ground motion. Motion of the magnet 60 along the axis of the coil 50 creates a voltage as a result of Faraday's law of electromagnetic induction. The induced voltage is given by $$E = \frac{-d(N\Phi_B)}{dt}$$

where $N\Phi_B$ is the flux linkage and $N$ is the number of turns in the coil. The combination of the magnet 60 and coil 50 may be chosen to produce peak voltages on the order of a few hundred millivolts in a compact size. These voltages will produce phase shifts on the order of a few tens of milliradians in the optical signal guided by the optical waveguide 14.

It should be noted that the motion of the magnet 50 is driven by both the frequency and magnitude of the external disturbance. The time varying voltage that is generated is applied across the electrodes 40 and 44, causing phase modulation of the light passing through the waveguide 14. The amount of phase shift that is obtained is related to the optical wavelength, size (length and gap), the applied voltage and the electrooptic (Pockels) coefficients of the waveguide 14. The phase shift may be written as $$\Delta\Phi_{EO} = \frac{\pi\eta_2^3 r_{41} VL}{t_g \lambda_o}$$

where $\eta$ is the refractive index, $V$ is the applied voltage across the electrodes 40 and 44, $L$ is the length of the electrodes 40 and 44, $t_g$ is the gap between the electrodes 40 and 44, $\lambda_o$ is the free space wavelength of the optical signal and $r_{41}$ is the electro-optic coefficient of the optical waveguides. A Typical conversion efficiency is approximately 1 rad/1 V. A low power CMOS amplifier 62 may be included in the circuit between the coil 50 and the electrodes 40 and 42 to boost the voltage if it is necessary to generate larger phase shifts. The amplifier 62 preferably is powered by a lithium battery (not shown) which has a life time of several years.

The phase modulated signal appears at the output of the interferometer and is proportional to the input disturbance. In this scheme the applied mechanical disturbance that causes movement of the magnetic 60 along the longitudinal axis of the coil 50 is transformed to an optical phase difference in the waves guided by the optical waveguides 13 and 14 via the electro-optic properties of the waveguide material.

Michelson Interferometer and Moving Magnet

Figure 2:
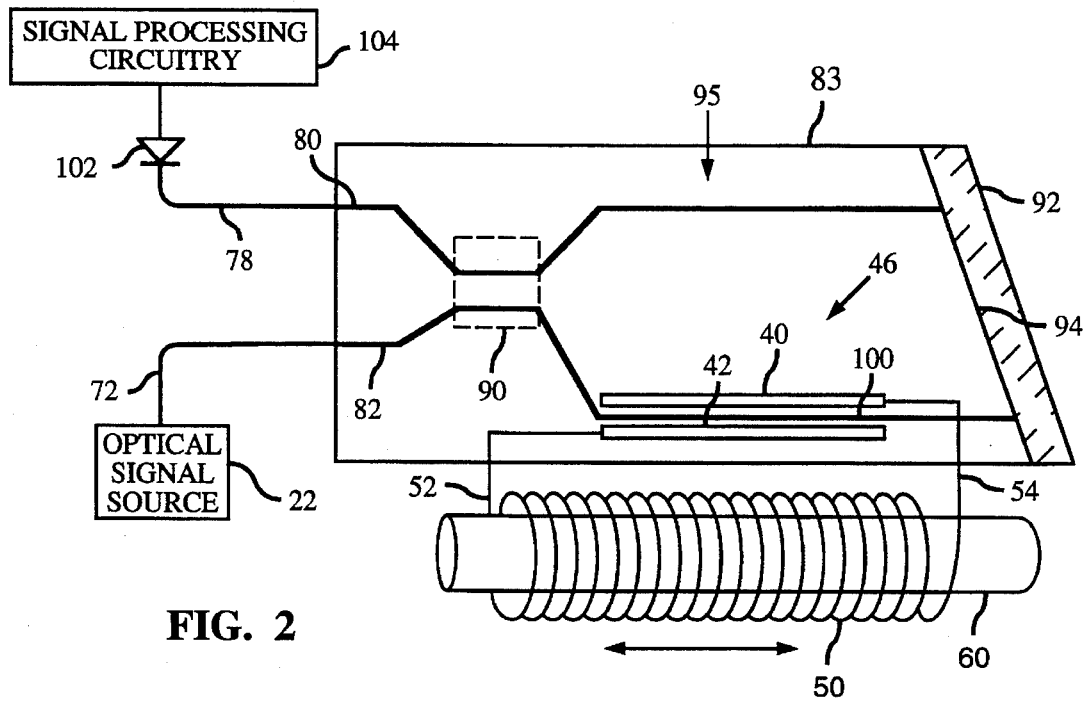
FIG. 2 schematically illustrates a second embodiment of a velocity sensor according to the present invention that includes a Michelson interferometer formed using optical waveguides.

FIG. 2 illustrates an embodiment of the invention that includes a Michelson interferometer 95 instead of the Mach- Zehnder configuration of FIG. 1. The optical signal source 22 provides optical signals to an optical fiber 72. The optical fiber 72 guides the optical signals to optical waveguide 82 formed in a substrate 83.

Optical signals then propagate in the optical waveguide 82 to an evanescent field coupler 90 formed between the optical waveguide 80 and a second optical waveguide 82 that is also formed in the substrate 83. The evanescent field coupler 90 couples optical signals between the optical waveguides 80 and 82. After passing through the evanescent field coupler 90, optical signals in the optical waveguides 80 and 82 propagate to a mirror 92 formed on an edge 94 of the substrate 83. The combination of the optical waveguides 80 and 82, the evanescent field coupler 90 and the mirror 92 cooperate to form a Michelson interferometer 95. The optical waveguides 80 and 82 preferably have different optical paths between the evanescent field coupler 90 and the mirror 92.

A portion 100 of the optical waveguide 82 passes between the electrodes 40 and 42. The leads 52 and 54 are connected between the electrodes 40 and 42 and the coil 50 as described above with reference to FIG. 1 to form the phase modulator 46. The magnet 60 is arranged as described above with reference to FIG. 1 so that ground motion that causes the magnet 60 to move along the axis of the coil 50 induces a voltage across the coil 50.

The phase modulated light propagates in the optical waveguide 82 to the mirror 92, which reflects the light back through the phase modulator 46. The light then receives an additional phase shift as it propagates between the electrodes 40 and 42 of the phase modulator 46. Because the reflected light travels the opposite direction in the waveguide portion 100, the phase shifts from the two passes of the waves through the phase modulator 46 are cumulative. The reflected light in the waveguides 80 and 82 then impinges upon the evanescent field coupler 90, which combines the reflected waves and forms an interference pattern. The interference pattern then propagates in the waveguide 80 to the optical fiber 78, which directs the light to a photodetector 102. The photodetector 102 produces electrical signals that are indicative of the light intensity in the interference pattern. These electrical signals are then directed to signal processing circuitry 104 that may be substantially identical to the signal processing circuitry 32.

Therefore, it is seen that the invention may be practiced using either a Mach-Zehnder or a Michelson interferometer. In either case, one leg of the interferometer has an optical pathlength that is slightly longer the other. This slight optical path mismatch causes a phase generated carrier when the device is exposed to frequency modulated light. Therefore, the optical signal source 22 preferably produces a frequency modulated light output. The Michelson configuration has the added advantage of yielding twice the optical phase shift as the Mach-Zehnder for a given physical length due to the double pass the light makes in the interferometer.

Triaxial Sensor

Figure 4:
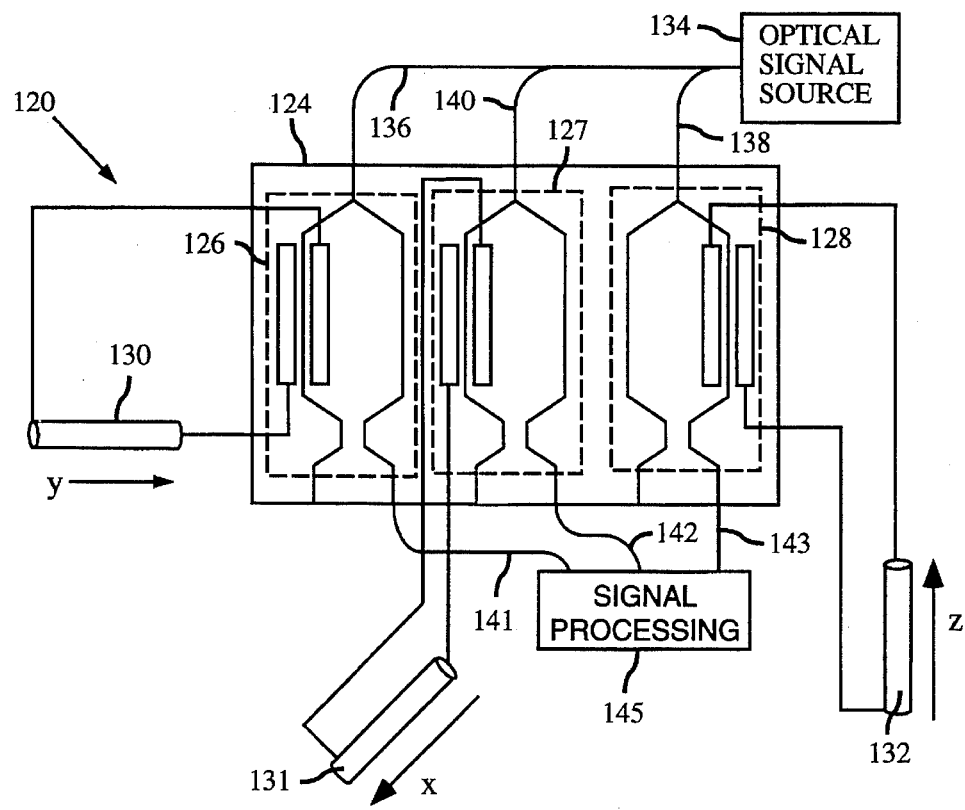
FIG. 4 schematically illustrates a three-axis waveguide velocity sensor formed according to the present invention.

Referring to FIG. 4, a triaxial vibration sensor 120 may be formed using a single substrate 124. Three interferometers 126–128 can be made on the substrate 124 with corresponding magnet/coil assemblies 130–132 being arranged mutually perpendicular to each other to detect vibrations along the x, y and z axes. The interferometers may conveniently be formed in the manner described with reference to FIG. 1. The magnet/coil assembly 132 is oriented to sense vertical displacements. The other two magnet/coil assemblies 130 and 131 are arranged to be perpendicular to each other in a horizontal plane to sense only horizontal displacements.

The magnitude and frequency content of the vertical channel gives the "signature" of the disturbance while the bearing (direction) is found by the superposition of the output from the two horizontal channels 130 and 131. It should be noted that using only one sensor would give a 180° bearing ambiguity. Therefore, one sensor is not capable of yielding absolute directional information. The sensor 120 as described above should be capable of sensing velocity-induced displacements out to a range of 1.0 to 2.0 kHz.

Piezoelectric Crystal and Mach-Zehnder Interferometer

Figure 3:
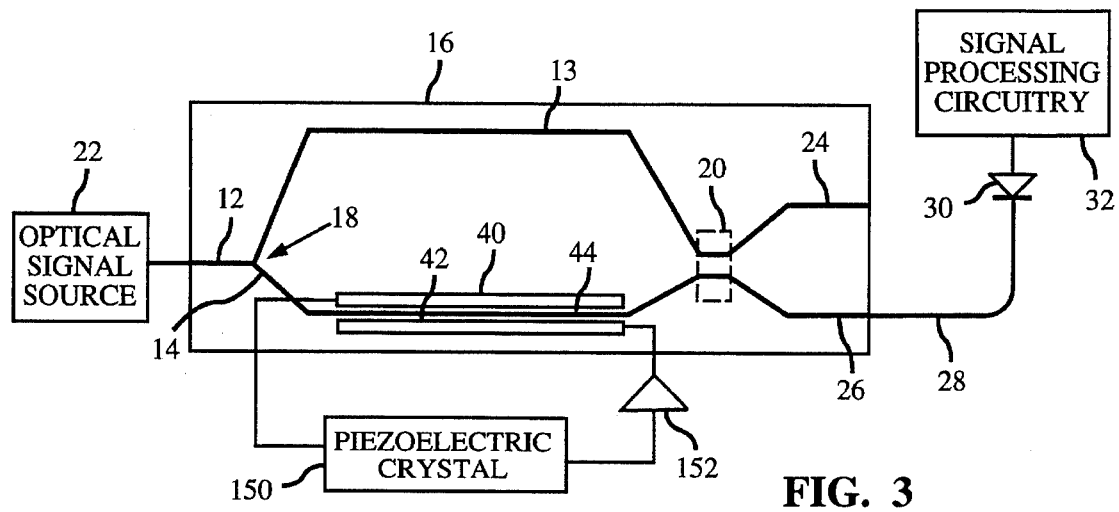
FIG. 3 illustrates an embodiment of the invention in which a piezoelectric crystal is used to provide a signal indicative of mechanical vibrations to an interferometer.

Referring to FIG. 3, an alternate embodiment of the present invention replaces the 50 and magnet 60 with a piezoelectric crystal 150. The crystal 150, when stressed, produces a voltage. The voltage output from the crystal 150 is coupled to a CMOS amplifier 152 that amplifies the crystal output voltage by an amount sufficient to produce phase modulation in the waveguide 14. By selecting the piezoelectric crystal 150 for specific hoop, beam or longitudinal resonance, the frequency range of the sensor element can be extended to nearly 100 kHz.

Modular Seismic Sensor

The present invention also includes a novel optical seismic sensor and a modular distributed system that has the advantage of proving a low power deployable sensor system. The system includes the following elements: optical transmitter/receiver module 200, telemetry harness 202, and sensor elements 220 and 222. Other sensors (not shown) may be included in addition to the sensor elements 220 and 222.

The function of this unit is to transmit and receive optical signals from the sensor elements. Contained within this unit are the optical source (laser) and laser drive electronics, optical receiver, demultiplexing and demodulation (demux/demod) electronics. A block diagram of the optical transmitter/receiver module 200 and interchangeable sensor element is shown in FIG. 5.

A frequency synthesizer 210 provides a signal having frequency $\omega$ to a laser 212 and to a demultiplexer/demodulator 214. The laser 212 provides frequency modulated optical signals to a plurality of sensors 220 and 222. The sensors 220 and 222 may include both accelerometer sensor elements and acoustic sensor elements.

Signals from the sensors 220 and 222 are input to an optical receiver 224. The optical receiver 224 produces signals that are input to the demultiplexer/demodulator 214, which then produces signals that can be further processed to measure changes in the parameters being sensed.

The laser optical source 212 and the laser drive electronics are interrelated and must be considered together. The laser is frequency modulated either directly, by mixing a small amplitude sine wave with the DC bias voltage, or by external phase modulation. The frequency modulation is done to eliminate signal fading of the interferometric signal at the optical receiver 224 and to allow the use of remote interrogation techniques such as FM or synthetic homodyne.

The sensors 220 and 222 are preferably interferometric in nature The external disturbance, such as a vibration propagating through the earth, sensed by the sensors 220 and 222 is converted to an optical phase shift. This optical phase shift is detected at the optical receiver 224 as an intensity variation. The optical receiver 224 converts the optical signal into a corresponding time varying voltage given by $$V(t)=A+B\cos(\Phi_m \cos\omega_m t + \Phi(t))$$

where, $\Phi_m$ and $\omega_m$ are laser modulation parameters, and $\Phi(t)$ is the detected information. This voltage is then sent to the demultiplexer/demodulator 214 where the desired information is extracted. Signal extraction preferably is done via the differentiate and cross multiply technique as described by Dandridge et al. "Homodyne Demodulation Scheme for Fiber Optic Sensors Using Phase Generated Carrier," pp 1647–1653, IEEE Journ. of Quant. Elec., Vol. QE-18, No. 10, October 1982.

To complete the discussion of the optical transmitter/ receiver module 200, various types of multiplexing architectures will be discussed. The scope of this discussion is limited to a few telemetry architectures, without going into great details of their workings, merits and faults. The two most popular forms of multiplexing presently used are time division (TDM) and frequency division (FDM) multiplexing as described by Kersey, "Multiplexed Interferometric Fiber Sensors," pp 313–319, 7th Optical Fiber Sensors Conference Proceedings, December 1990.

In the TDM technique, the sensors are arranged in such that their return signals are separated in time. Typically a pulsed optical source is used for this type of multiplexing. Therefore, the timing of the return pulse identifies the sensor position.

In the FDM approach, the array elements are arranged in an N×M/2 matrix, where N is the number of laser modules and M (M=2N) is the number of sensing elements. The optical modules are modulated at discrete frequencies, $\omega_1$, $\omega_2 \ldots \omega_N$. In this case the return times of the sensors are nominally the same but are separated by their specific carrier frequency, $\omega_f$.

A third common multiplexing technique is Wavelength Division Multiplexing (WDM). In this case, lasers of different wavelength are used, and the sensor returns are separated by color (or optical frequency). Hybrid multiplexing techniques using the above multiplexing techniques in combination have been proposed and have been shown to be theoretically feasible.

The telemetry approach taken in a detection network is governed by several factors: the number of sensors, the proximity of the sensors with respect to each other, and the minimum detectable signal. These factors are traded off to arrive at an architecture that will allow the system to meet its performance goals.

A system using a trip-wire mode will allow longer utilization time before re supply is needed. A single sensor in the array is used to monitor the environment. Detection of a signal level that exceeds a preset value causes the power-up of the entire array, and begins data collection. Array level data is then stored in a CMOS memory for retrieval later (through remote means). This store and dump technique will not only lengthen the field time of the systems but also reduce the amount of data that needs to be processed. Alternatively, the system can be configured for continuous operation.

Systems can be composed of a single sensor type or a combination of sensor elements using a modular design approach. Choosing combinations for a particular mission will maximize array use and data obtained. As an example, an array composed of five seismic and five acoustic sensors laid out in a grid would yield the bearing location from the seismic elements (multiple directional sensors are required to get rid of bearing ambiguities) and target ID via the acoustic grid. Improvements in the signal to noise ratio are obtained via array gain. In the above example an array gain of 7 db, 10 log N where N is the number of sensors in the array, would be realized. This, of course, is a simple sum. However, weighted sums can be applied to improve directionality of the array.

Referring to FIG. 6, a sensor module 230 includes a radio transceiver 232 and a power supply/processor unit 234. The sensor module 230 thus is capable of telemetering information back to a central monitoring location. Additionally, a GPS unit can be included if absolute position is required. Deployment of a grid of these would enable the localization of targets.

FIG. 7 illustrates a transmit/receive module power supply/ processor unit 236. A plurality of sensors $S_1, S_2, \ldots S_n$ are connected to a bus 238, which carries signals from the sensors $S_1, S_2, \ldots S_n$ to the transmit/receive module power supply/processor unit 236. Each sensor may be formed according to the invention as described herein with reference to FIGS. 1–4 and 8–10.

Dual Phase Modulator Seismic Sensor

Figure 8:
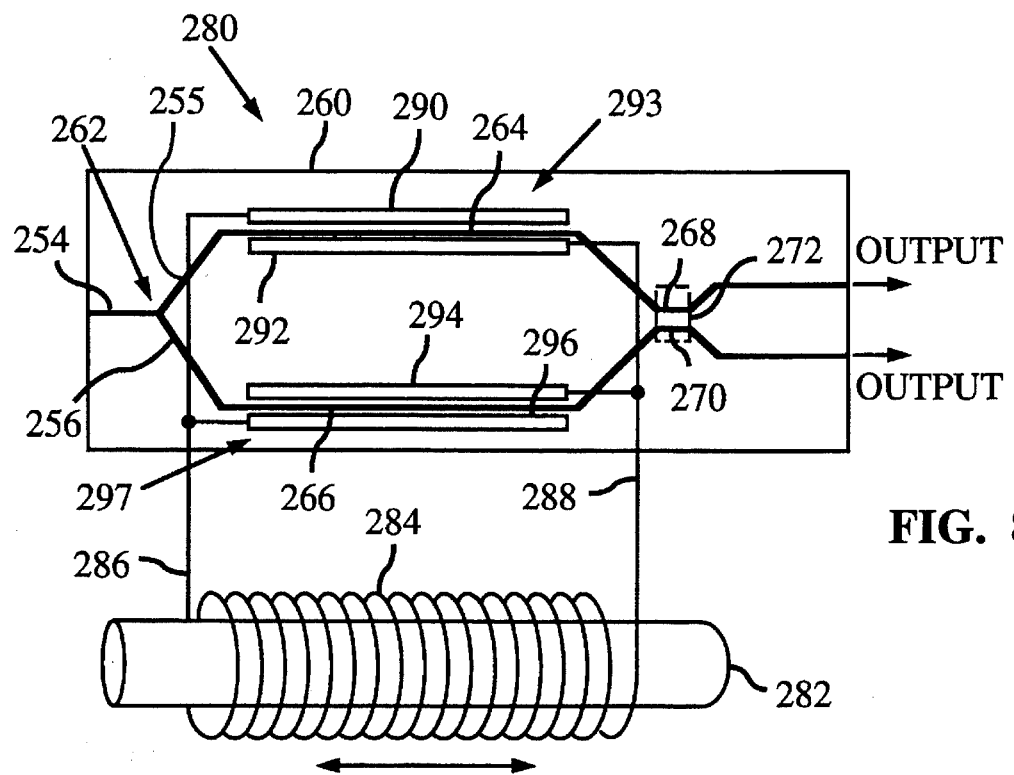
FIG. 8 is a top plan view showing an alternate phase modulator structure that may be included in the present invention.

Referring to FIG. 8, there is shown an embodiment of the invention that includes a pair of phase modulators 293 and 297. Three optical waveguides 254–256 formed in a substrate 260 intersect to form a Y-coupler 262. An optical signal may be introduced to the optical waveguide 254, which then guides the optical signal to the Y-coupler 262. The optical waveguides 255 and 256 diverge away from the Y-coupler 262 and then have linear parallel sections 264 and 266, respectively. Optical signals input via the optical waveguide 254 travel through the parallel optical waveguide sections 264 and 266. The optical waveguides 255 and 256 then converge to closely-spaced parallel sections 268 and 270, respectively, which form an evanescent field coupler 272. The Y-coupler 262, the evanescent field coupler 272 and the portion of the optical waveguides 255 and 256 between these two couplers forms a Mach-Zehnder interferometer 280.

Figure 10:
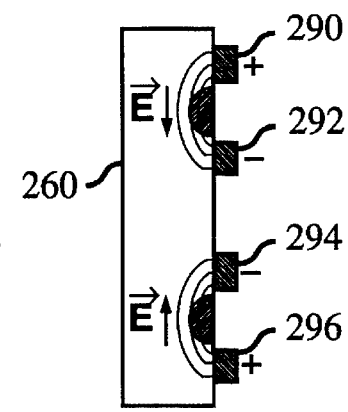
FIG. 10 is a cross-sectional view showing the electrode configurations and electric field direction in the phase modulator structure of FIGS. 8 and 9.

A magnet 282 and a coil 284 are arranged in manner similar to the magnet 60 and coil 50 as described above with reference to FIG. 1. Electrically conductive leads 286 and 288 extend from the ends of the coil. Referring to FIGS. 8 and 10, a first pair of electrodes 290 and 292 are mounted on the substrate 260 and arranged to be parallel to the section 264 of the optical waveguide 255. The electrodes 290 and 292 are on opposite sides of the optical waveguide section 264 and form the phase modulator 293. A second pair of electrodes 294 and 296 are mounted on the substrate 260 on opposite sides of the optical waveguide section 266 and form the phase modulator 297.

Figure 9:
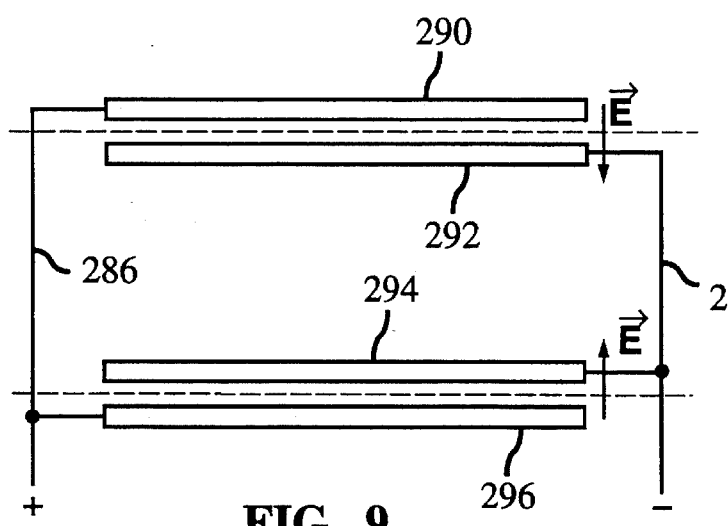
FIG. 9 shows electrical connections and electric field directions in the phase modulator structure of FIG. 8.

The electrically conductive lead 286 is connected to the electrode 290 in the first electrode pair and the electrode 296 in the second electrode pair. The lead 288 is connected to the electrode 292 in the first electrode pair and the electrode 294 in the second electrode pair. For a given direction of movement of the magnet 282 and coil 284, one of the leads will be at a higher electrical potential than the other. It is assumed for the present discussion that the lead 286 is the positive and that the lead 288 therefore is the negative. The electrodes 290 and 296 will therefore be positive with respect to the electrodes 292 and 294. Therefore, as shown in FIGS. 8–10, the electric fields across the optical waveguide sections 264 and 266 are oppositely directed.

For a given voltage, the arrangement described above for connecting the coil 284 to the phase modulators 293 and 297 produces twice the phase shift between optical signals guided by the optical waveguide sections 262 and 264 than is produced with a single electrode pair. The increased phase shift arises because optical signals in one optical waveguide section experience a positive phase shift while optical signals in the other optical waveguide section experience a negative phase shift. The magnitudes of these positive and negative shifts are the same if the electrode size and configuration are the same for each of phase modulators 293 and 297.

It should be noted that the dual phase modulator arrangement of FIG. 8 could be incorporated into a Michelson interferometer. The Michelson interferometer with two phase modulators would have four times the phase shift of the standard Mach-Zehnder interferometer design of FIG. 1.

Discussed above is a novel approach for the sensing of ground born velocity and the relative bearing of the disturbance. Two configurations of the device are available, one with an estimated response bandwidth near 2.0 kHz, the other with a potential bandwidth near 100 kHz. In addition, an acoustic configuration of the sensor element is also pointed out. The system level approach incorporates a modular design, that provides flexibility of the optical transmitter/receiver module design details and longer deployments between re supply due to the trip wire detection method.

It should be noted that an acoustic sensor can be made using either the coil/magnet embodiments of FIGS. 1 and 2 or the piezoelectric crystal of FIG. 3. Slight reconfiguration of the sensors would be required to form an acoustic sensor. In the case of the embodiment of FIG. 3, the piezoelectric crystal must be exposed to the dynamic acoustic field. For the coil/magnet configurations of FIGS. 1 and 2, the magnet may acted on by the acoustic field via a diaphragm.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing descriptions define the scope of the invention. All modifications to the embodiments described herein that come within the meaning and range of equivalence of the claims are embraced within the scope of the invention.

What is claimed is:

1. A sensor for measuring parameters of vibrations, comprising:

an interferometer including a first leg having a first optical path length and a second leg having a second optical path length formed such that the first optical path length is longer than the second optical path length;

an optical signal generator connected to the interferometer to apply a frequency modulated optical signal input thereto;

a first pair of electrodes placed adjacent one of the legs of the interferometer to form a first phase modulator;

a coil of wire connected between the pair of electrodes;

a magnet arranged to have freedom of motion longitudinally inside the coil in response to externally applied forces, thereby inducing a voltage in the coil, the voltage being applied to the first pair of electrodes, which causes phase modulation of optical signals guided by the leg of the interferometer adjacent the first pair of electrodes; and apparatus for processing optical signals output from the interferometer to determine the velocity and acceleration associated with the vibration.

2. The sensor of claim 1, further including a second pair of electrodes placed adjacent the other leg of the interferometer to form a second phase modulator, the coil being connected to the first and second phase modulators such that optical signals guided by the two legs of the interferometer receive phase opposite phase shifts in response to motion of the magnet.

3. The sensor of claim 1, further including an amplifier connected between the coil and one of the electrodes.

4. A sensor for measuring parameters of vibrations, comprising:

an interferometer including a first leg having a first optical path length and a second leg having a second optical path length formed such that the first optical path length is longer than the second optical path length;

an optical signal generator connected to the interferometer to apply a frequency modulated optical signal input thereto;

a phase modulator arranged for modulating the phase of optical signals guided by the first leg of the interferometer;

a piezoelectric crystal arranged to receive vibrations to be measured and produce an electrical signal in response to stresses caused by the ground-borne vibrations, the electrical signal being connected to the first phase modulator such that the optical signals are modulated by a signal having the frequency of the vibrations being measured; and apparatus for processing optical signals output from the interferometer to determine the velocity and acceleration associated with the vibration.

5. The sensor of claim 4, further including an amplifier connected between the piezoelectric crystal and the phase modulator.

6. A sensor for measuring parameters of vibrations, comprising:

a planar optical waveguide structure;

means for introducing an optical signal into the optical waveguide;

means for detecting vibrations due to an external field and producing an electrical signal indicative of the vibrations; and a phase modulator connected to receive as an input the electrical signal indicative of the vibrations for causing a phase shift in the optical signal guided by the optical waveguide such that the phase shift is a known function of the magnitude of the vibration.

7. A method for forming a sensor measuring parameters of vibrations, comprising the steps of:

forming an interferometer including a first leg having a first optical path length and a second leg having a second optical path length formed such that the first optical path length is longer than the second optical path length;

connecting an optical signal generator to the interferometer to apply a frequency modulated optical signal input thereto;

placing a first pair of electrodes adjacent one of the legs of the interferometer to form a first phase modulator;

connecting a coil of wire between the pair of electrodes;

arranging a magnet to have freedom of motion longitudinally inside the coil in response to externally applied forces, thereby inducing a voltage in the coil, the voltage being applied to the first pair of electrodes, which causes phase modulation of optical signals guided by the leg of the interferometer adjacent the first pair of electrodes; and processing optical signals output from the interferometer to determine the velocity and acceleration associated with the vibration.

8. The method of claim 7, further including the step of:

placing a second pair of electrodes adjacent the other leg of the interferometer to form a second phase modulator; and connecting the coil being to the first and second phase modulators such that optical signals guided by the two legs of the interferometer receive phase opposite phase shifts in response to the vibration.

9. The method of claim 7 further including the step of connecting an amplifier between the coil and one of the electrodes.

10. A method for forming a sensor measuring parameters of vibrations, comprising the steps of:

forming an interferometer including a first leg having a first optical path length and a second leg having a second optical path length formed such that the first optical path length is longer than the second optical path length;

connecting an optical signal generator to the interferometer to apply a frequency modulated optical signal input thereto;

arranging a first phase modulator for modulating the phase of optical signals guided by one leg of the interferometer;

arranging a piezoelectric crystal to receive vibrations to be measured and produce an electrical signal in response to stresses caused by the ground-borne vibrations, the electrical signal being connected to the first phase modulator such that the optical signals are modulated by a signal having the frequency of the vibrations being measured; and processing optical signals output from the interferometer to determine the velocity and acceleration associated with the vibration.

11. The method of claim 10, further including the step of connecting an amplifier between the piezoelectric crystal and the phase modulator.

12. A method for forming a sensor measuring parameters of vibrations, comprising the steps of:

forming a planar optical waveguide structure;

introducing an optical signal into the optical waveguide;

detecting vibrations due to an external field and producing an electrical signal indicative of the vibrations; and connecting a phase modulator to receive as an input the electrical signal indicative of the vibrations for causing a phase shift in the optical signal guided by the optical waveguide such that the phase shift is a known function of the magnitude of the vibration.

* * * * *